United States Patent [19]
Chiang

[11] Patent Number: 5,469,810
[45] Date of Patent: Nov. 28, 1995

[54] RAISING CONTROL APPARATUS FOR LIVING FISH AND WATER PLANTS

[76] Inventor: Ming-Tsung Chiang, No. 4, Lane 543, Chung Cheng Rd., Yuan Lin Chen, Changhua Hsien, Taiwan

[21] Appl. No.: 237,839

[22] Filed: May 4, 1994

[51] Int. Cl.⁶ .................................................. A01K 63/04
[52] U.S. Cl. ........................................ 119/248; 119/225
[58] Field of Search ................................. 119/224, 225, 119/248

[56] References Cited

U.S. PATENT DOCUMENTS

| | | | |
|---|---|---|---|
| 3,122,126 | 2/1964 | Yamada | 119/225 |
| 3,773,014 | 11/1973 | Ewald, Jr. | 119/224 |
| 4,723,511 | 2/1988 | Solman et al. | 119/224 |

*Primary Examiner*—Robert P. Swiatek
*Attorney, Agent, or Firm*—Alfred Lei

[57] ABSTRACT

A raising control apparatus for living fish and water plants including a plurality of aquarium assemblies each including a frame having a plurality of partitions, a water quality stabilizing trough fitted in a lowest one of the partitions, a plurality of tanks each fitted in one of the remaining partitions, a pump having an inlet connected with the water quality stabilizing trough and an outlet connected with the tank at the uppermost one of the partitions of the frame, a horizontally disposed dripping pipe connected between lower ends of the tubes and having a plurality of perforations, a first downwardly depending pipe connected with an end of the dripping pipe, and a second downwardly depending pipe connected with another end of the dripping pipe; and a water supply device having a reservoir connected with the water collecting chamber of the water quality stabilizing trough via a float ball valve.

4 Claims, 10 Drawing Sheets

RAISING CONTROL APPARATUS FOR LIVING FISH AND WATER PLANTS

BACKGROUND OF THE INVENTION

It has been found that the prior art raising apparatus for living fish and water plants is unsatisfactory in use. As illustrated in FIG. 1, the raising apparatus 101 for living fish and water plants includes a frame 111, a plurality of tanks 121 fitted into the frame 111, a filter 131 mounted under the tanks 121, a pump 501 connected with the filter 131 for forcing water up to the uppermost tank 121 from the filter 131 via a pipe 301. The tank 121 at the upper position is connected with the tank at the lower position by a pipe 201.

However, such a raising apparatus for living fish and water plants has the following drawbacks:

1. It is necessary to inspect the water level of the tanks and to supplement water into the tanks by manual power in case the water is below a predetermined level thereby causing much inconvenience in use.

2. The filter is simply a casing for receiving filtering material and the water flows through the casing so quickly that it is unfit for the survival of germs which can remove the harmful gases such as ammonia and neon in the water.

3. The tank cannot be divided into smaller chamber for different purposes.

Therefore, it is an object of the present invention to provide a raising control apparatus for living fish and water plants.

SUMMARY OF THE INVENTION

This invention relates to a raising control apparatus for living fish and water plants.

It is the primary object of the present invention to provide a raising control apparatus for living fish and water plants which can automatically supplement water to the aquariums.

It is another object of the present invention to provide a raising control apparatus for living fish and water plants which is fit for the survival of germs.

It is still another object of the present invention to provide a raising control apparatus for living fish and water plants which is convenient in use.

It is still another object of the present invention to provide a raising control apparatus for living fish and water plants wherein the aquarium can be partitioned into a number of chambers for keeping different kinds of fish.

It is a further object of the present invention to provide a raising control apparatus for living fish and water plants which is facile to manufacture.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
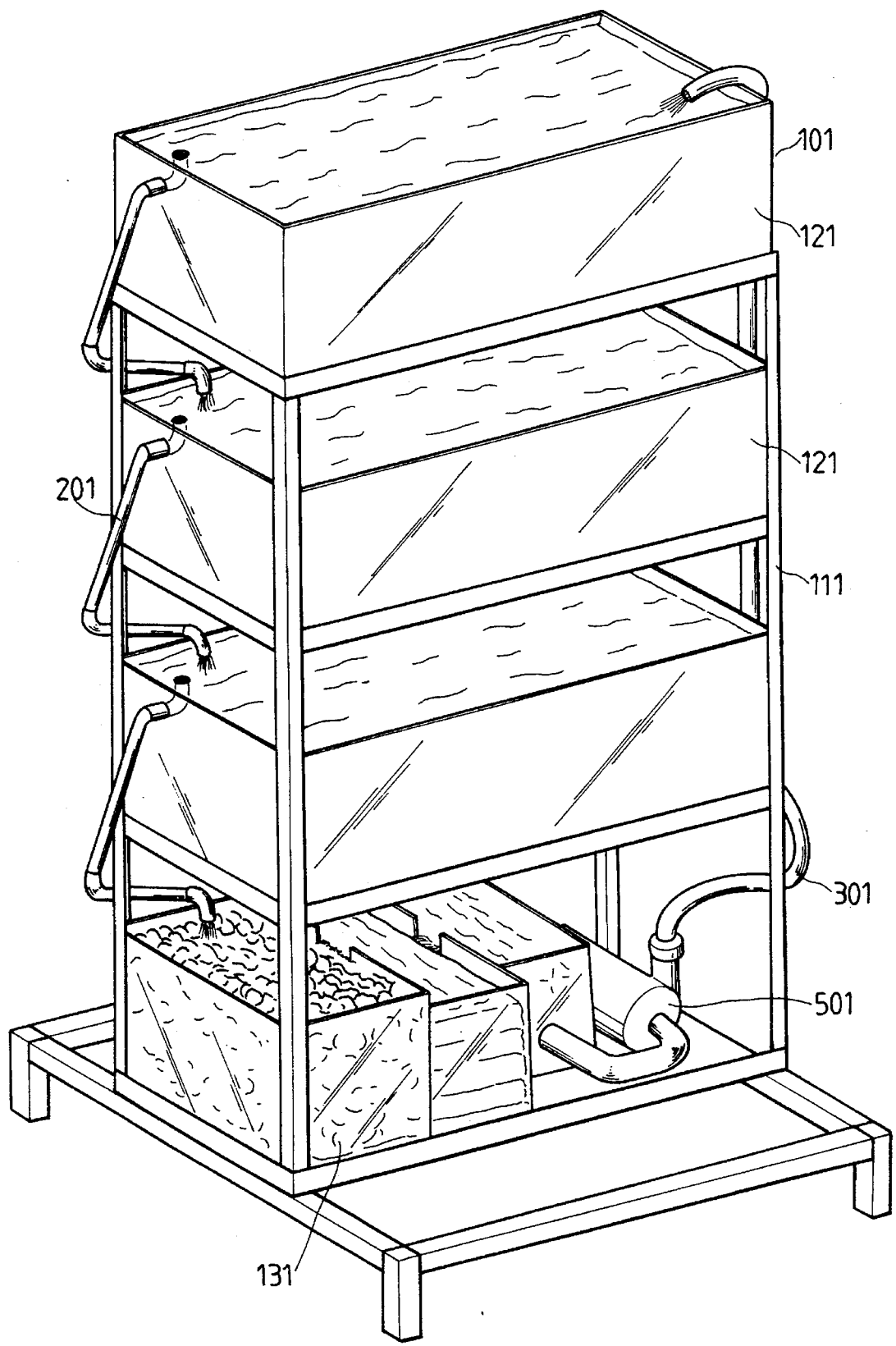
FIG. 1 is a perspective view of a prior art raising apparatus for living fish and water plants.
Figure 2A:
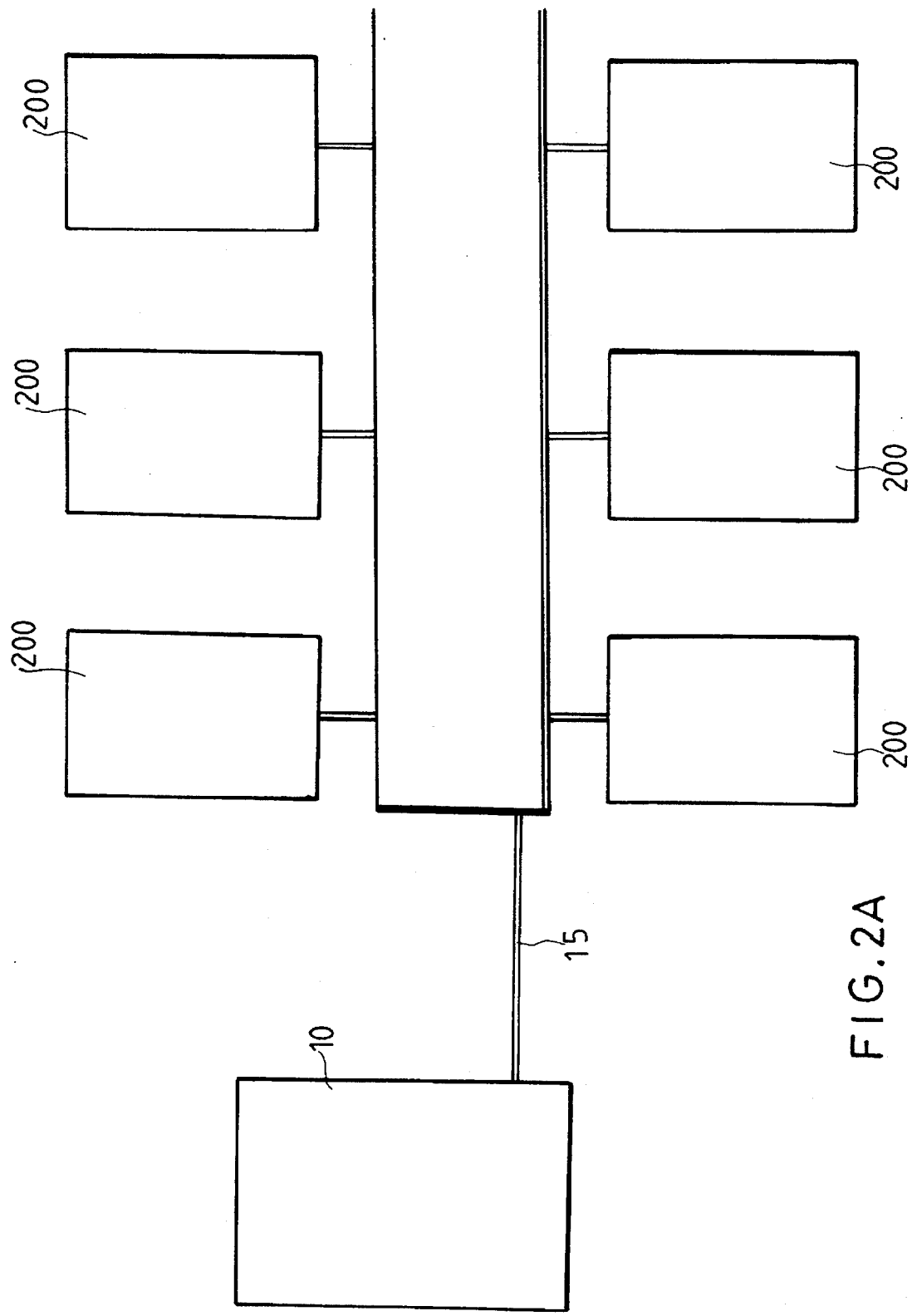
FIG. 2A is a schematic plan view of the present invention.
Figure 2B:
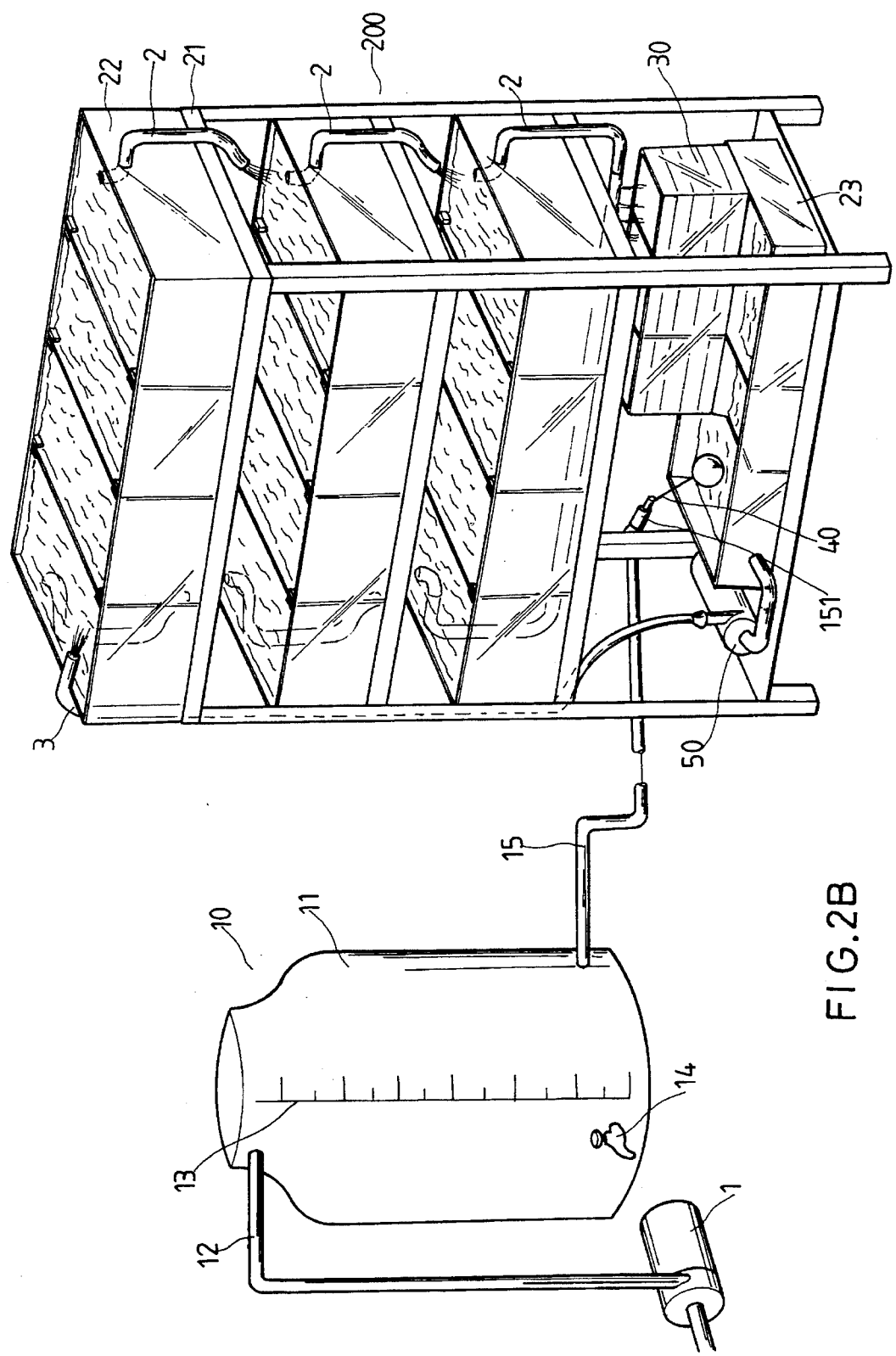
FIG. 2B is a perspective view of the present invention.
Figure 3A:
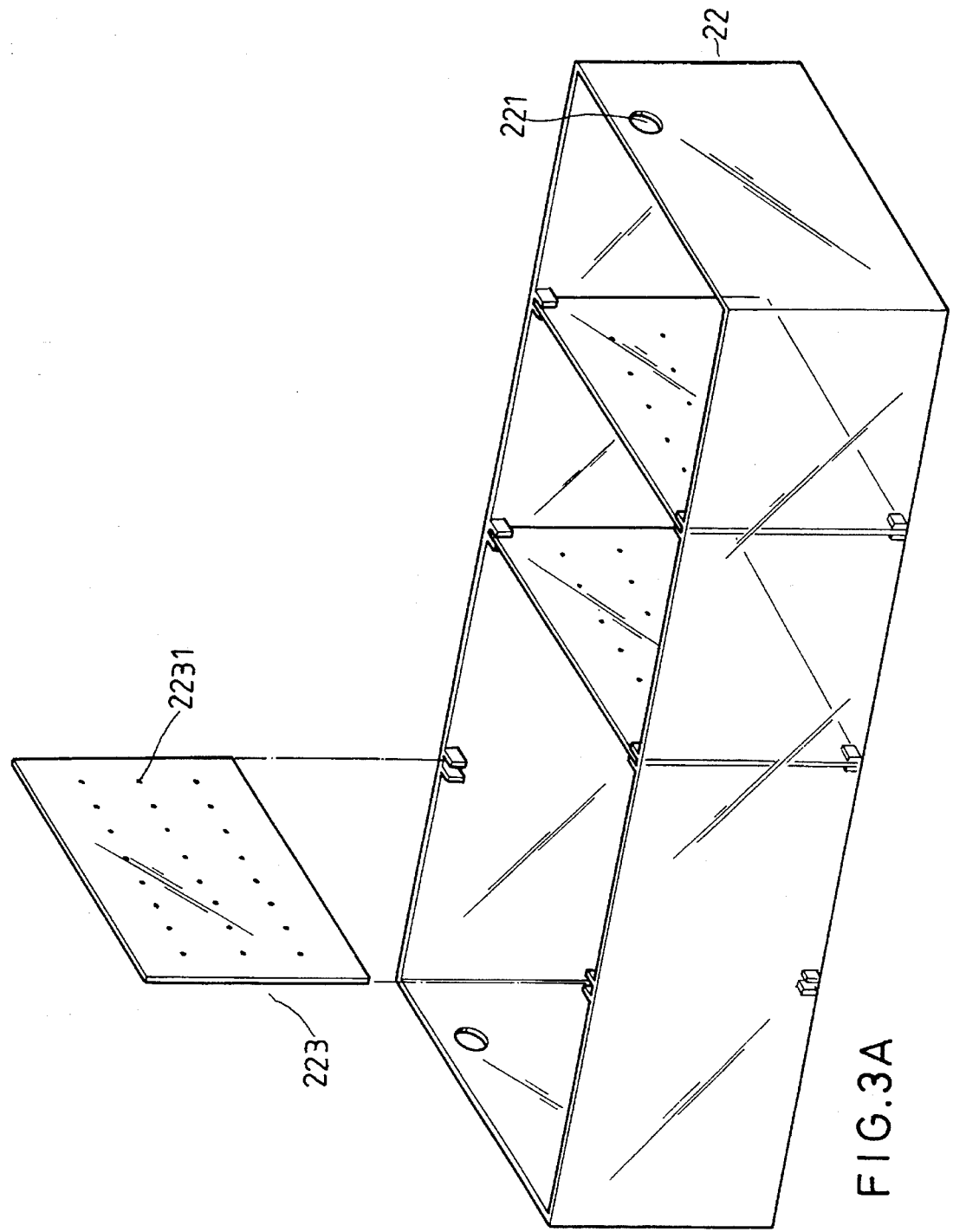
FIG. 3A is an enlarged perspective view of the tank according to the present invention.
Figure 3B:
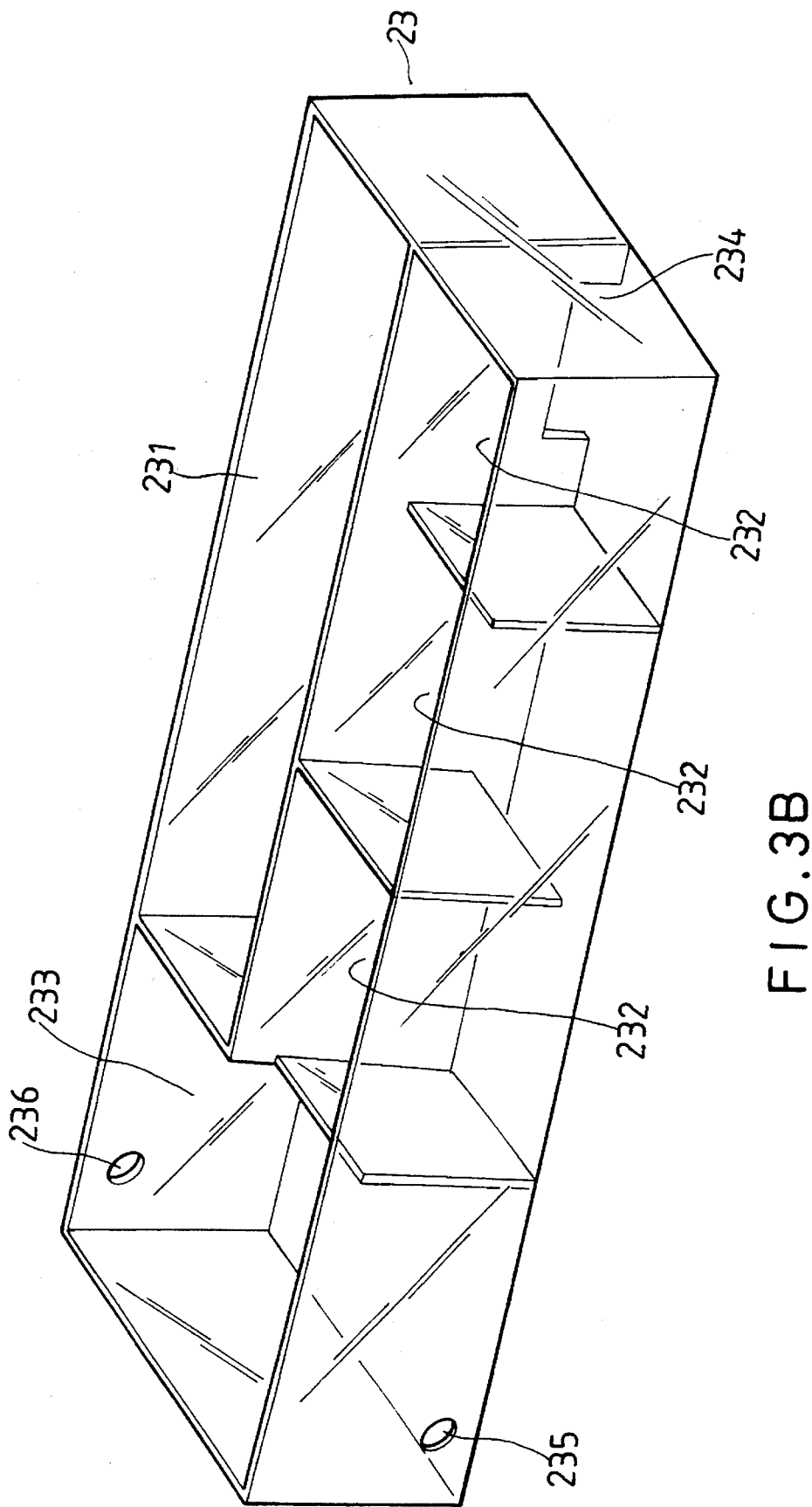
FIG. 3B is an enlarged perspective view of the water quality stabilizing trough according to the present invention.
Figures 4A, 4B:
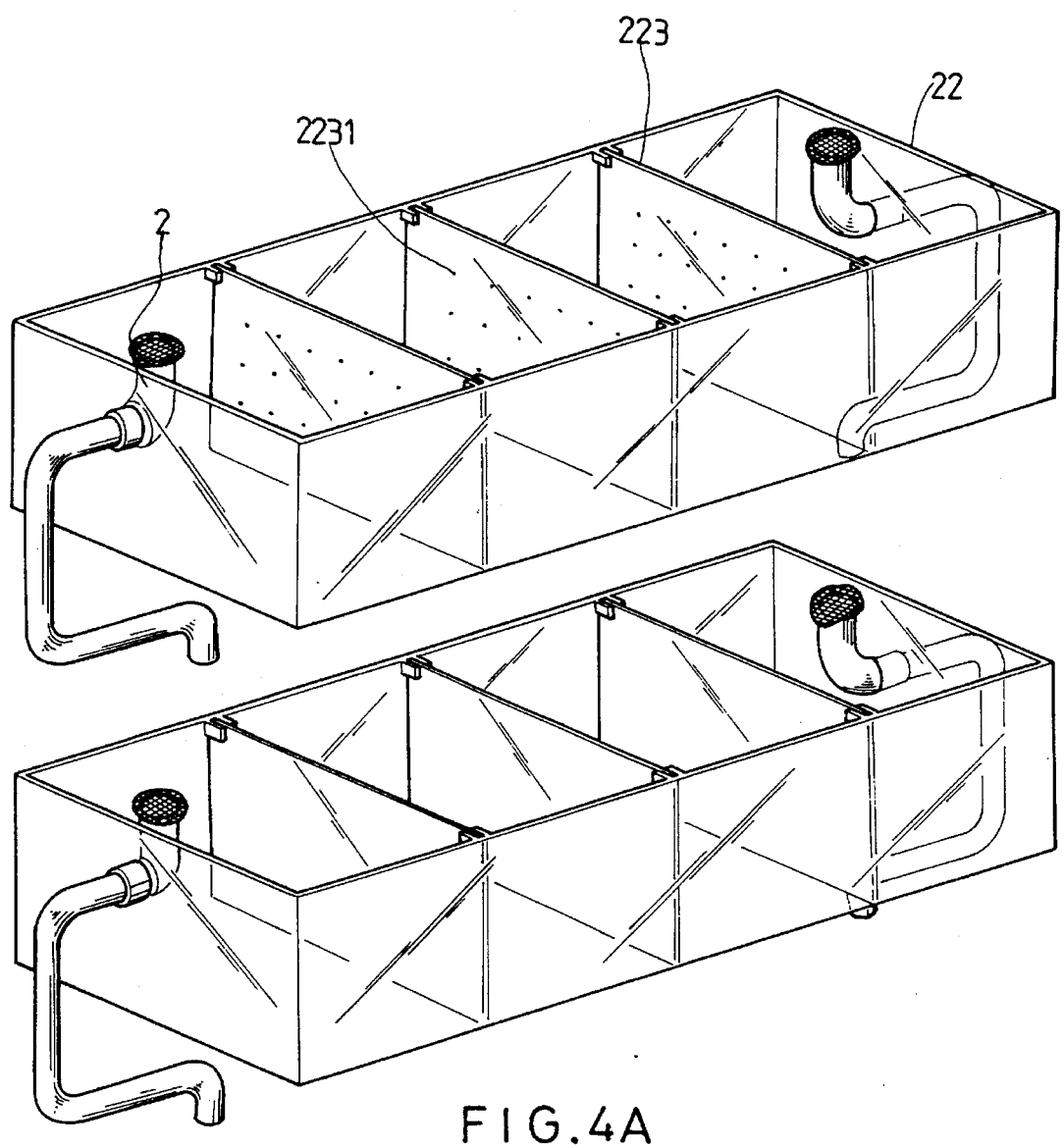
FIG. 4A shows the connection between two tanks according to the present invention.
FIG. 4B is an enlarged fragmentary view of FIG. 4A.

With reference to the drawings and in particular to FIGS. 2A and 2B thereof, the present invention mainly comprises a water supply device 10 and a plurality of aquarium assemblies 200. The water supply device 10 includes a reservoir 11 provided at the upper portion with an inlet 12 which is connected with a pump 1. Further, the reservoir 11 is calibrated with graduations 13, provided with an adjust valve 14, and connected with the aquarium assembly via a branch pipe 151 of the pipe 15 (see FIG. 5).

The aquarium assemblies 200 are connected in parallel as shown in FIG. 2A. Each aquarium assembly 200 includes a frame 21 having a plurality of partitions in each of which is fitted a tank 22. A water quality stabilizing trough 23 is fitted in the lowest partition of the frame 21. A plurality of additional filtering containers 30 are piled up on the water quality stabilizing trough 23. A float ball valve 40 is connected with the outlet of the branch pipe 151. A pump 50 is connected at the inlet with the water quality stabilizing trough 23. The outlet of the pump 50 is connected via a pipe 3 with the uppermost tank 22 which is in turn connected with the intermediate tank 22 via a pipe 2. In addition, the intermediate tank 22 is connected via a pipe 21 with the lowest tank 22.

Referring to FIGS. 3A, 3B, 4A and 4B, the tank 22 is a rectangular container with an open top and formed at both ends with an opening 221. Further, the tank 22 may be divided into a plurality of chambers by partition plates 223 which are formed with a plurality of perforations 2231. The opening 221 of a tank 22 is connected to the opening 221 of another one by a pipe 2 provided with a filter 4.

The water quality stabilizing trough 23 is also a rectangular member with an open top which is partitioned into a filtering chamber 231, a plurality of purifying chambers 232, and a water collecting chamber 233. The purifying chambers 232 are alternately partitioned by higher and lower partition plates. Further, the first purifying chamber 232 is connected with the filtering chamber 231 by a rectangular notch 234. The water collecting chamber 233 has an outlet 235 at the lower portion for connecting with the pump 50 and an overflow outlet 236 at the upper portion for connecting with a drain pipe (not shown).

Figure 5:
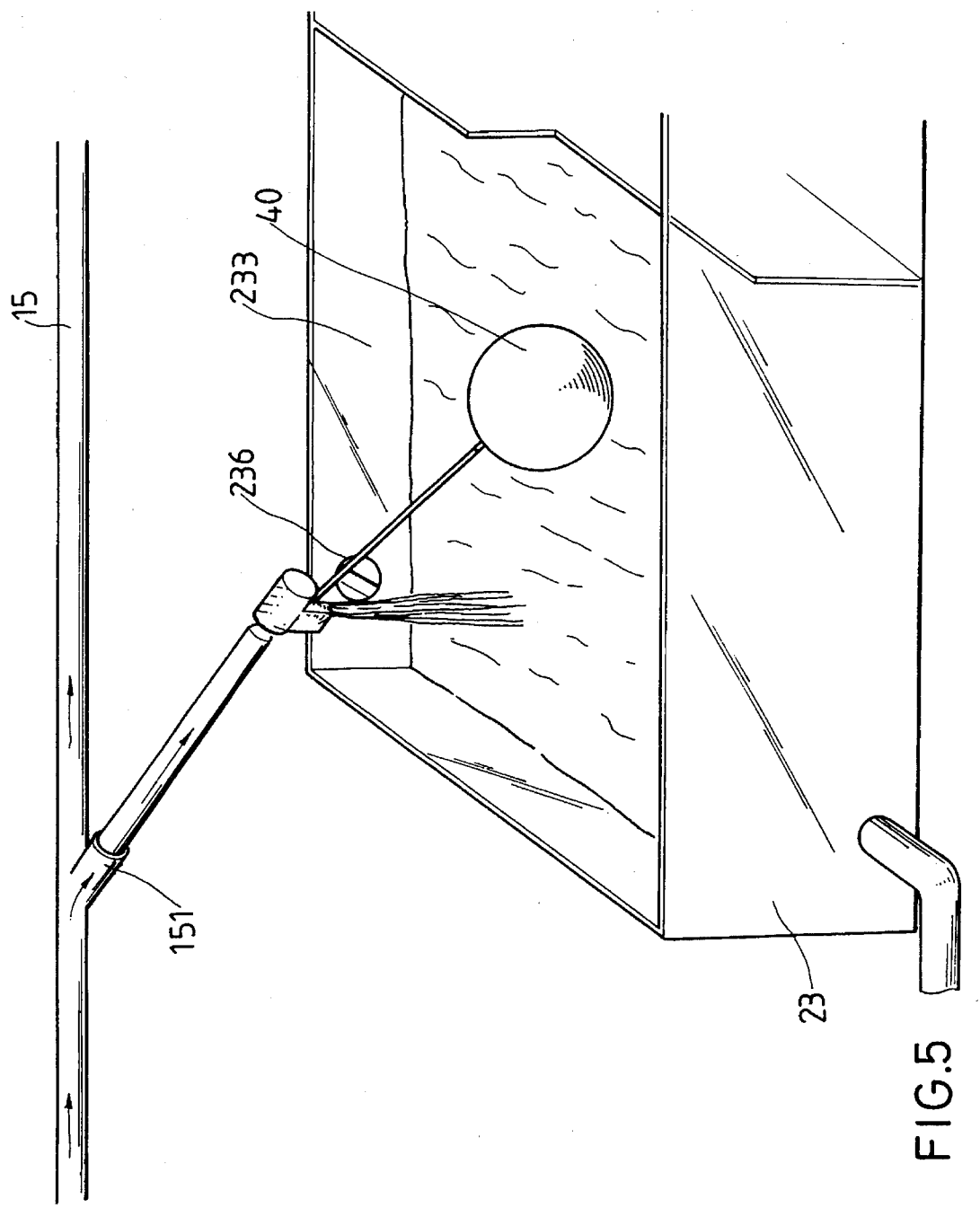
FIG. 5 shows the float ball valve according to the present invention.

Looking now at FIG. 5, the branch pipe 151 of the main pipe 15 is connected with a float ball valve 40 disposed in the water collecting chamber 233 of the water quality stabilizing trough 23 so that when the water in the water collecting chamber 223 goes below a predetermined level, the float ball valve 40 will open letting water flow into the water collecting chamber 223 from the water supply device 10 thereby always keeping the water in a constant level.

Figure 6:
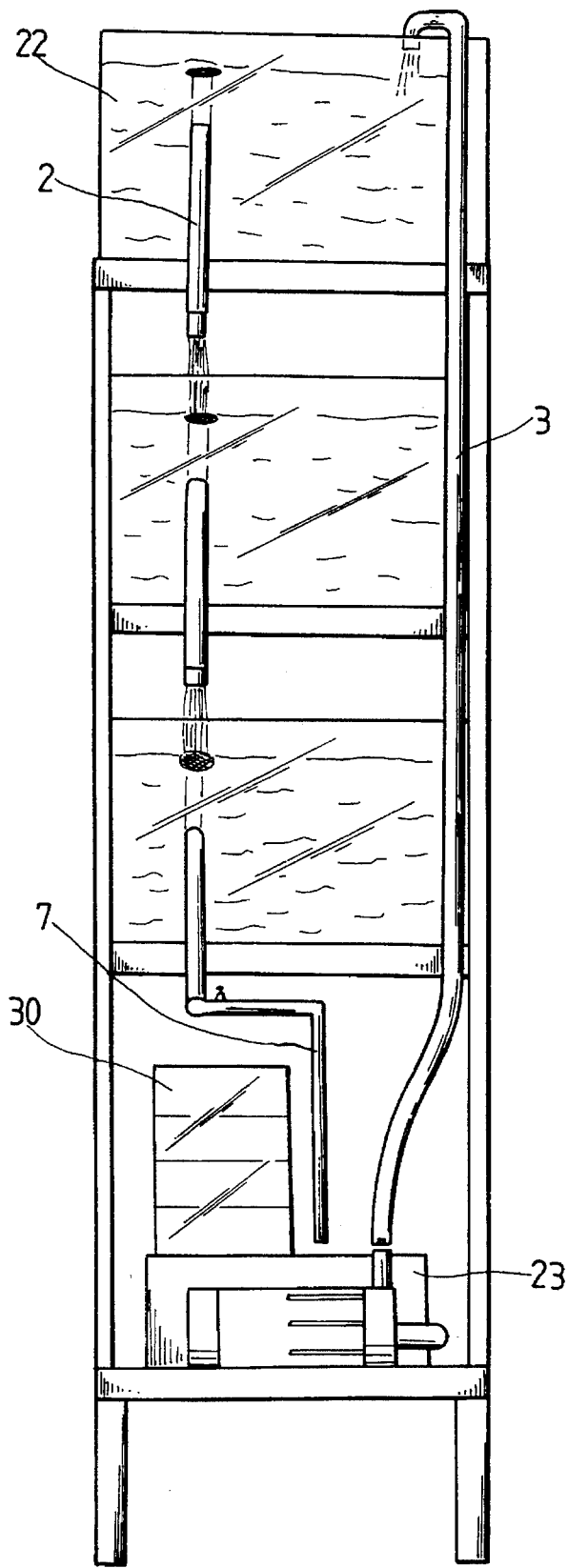
FIG. 6 illustrates how the water is cycled.
Figure 7:
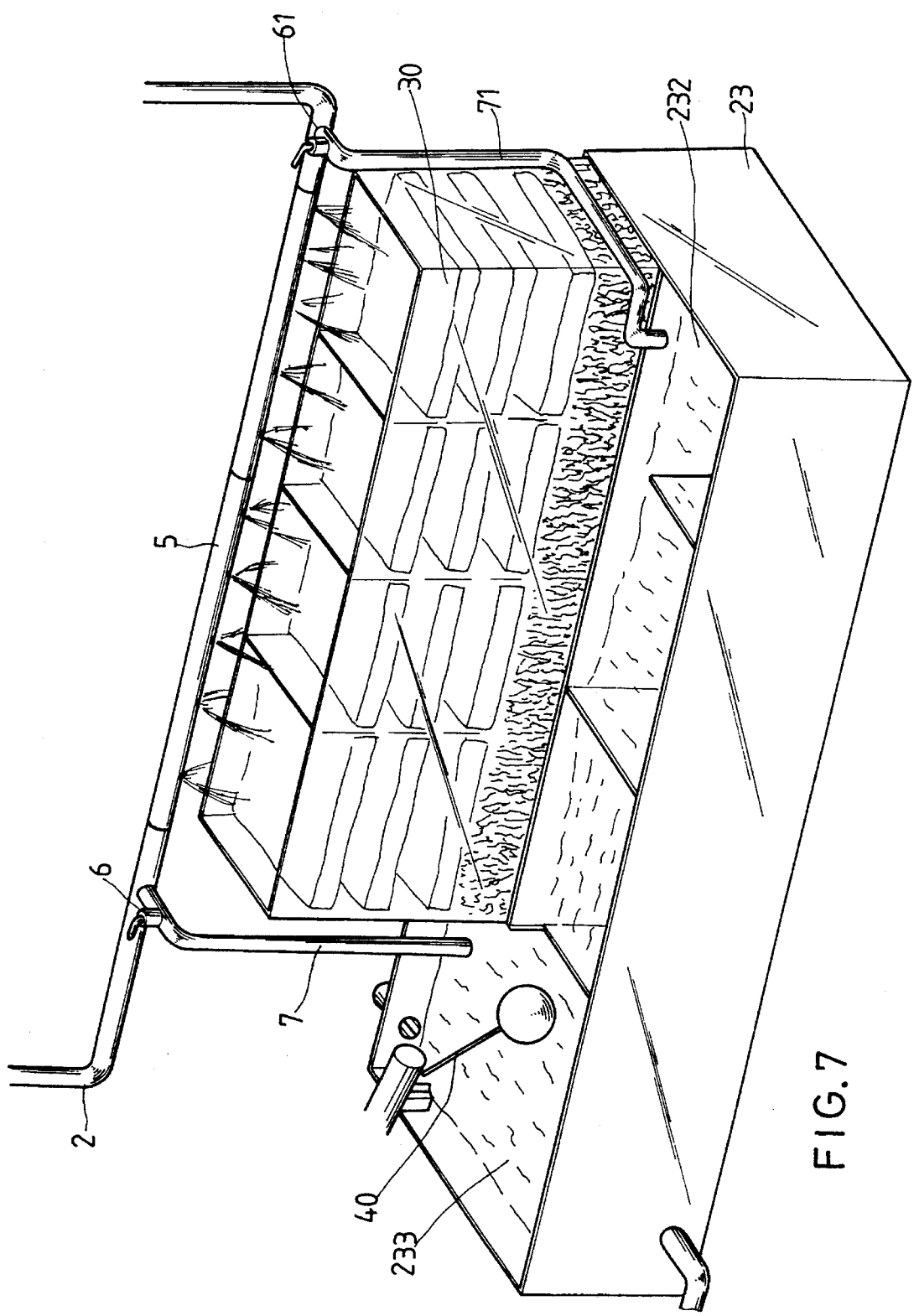
FIG. 7 shows how the water is filtered.
Figure 8:
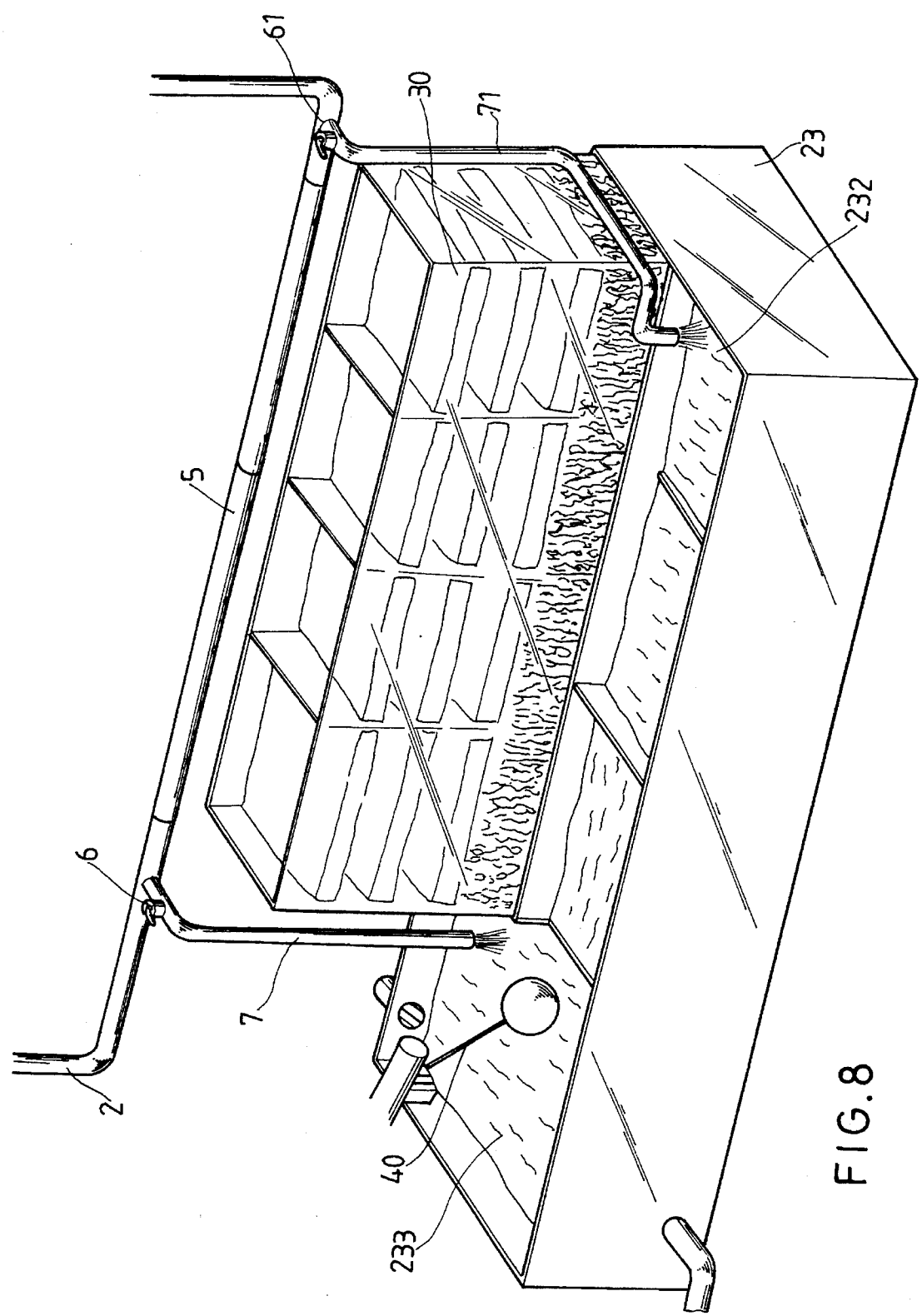
FIG. 8 illustrates how the water flows directly into the water collecting chamber and the purifying chamber.

When in use, the pump 50 first transmits the water in the water collecting chamber 233 upwardly to the uppermost tank 22 via a pipe 3 (see FIG. 6). Then, the water in the uppermost tank 22 will flow downwardly to the lower tanks 22. Thereafter, the water in the lowermost tank 22 will flow downwardly to the additional filtering containers 30 via the pipe 2 and the openings of a horizontal dripping pipe 5 above the additional filter troughs 30 in which is received filtering material. The additional filter troughs 30 are piled up on the filtering chamber 231 of the water quality stabilizing chamber 23. The dripping pipe 5 is connected with a first branch pipe 7 which depends downwardly into the water collecting chamber 233 and a second branch pipe 71 depends downwardly into the purifying water chamber 232 of the water quality stabilizing trough 23. Further, the first and second branch pipes 7 and 71 are respectively provided with a first control valve 6 and a second control valve 61 so that when medicine is added to the water for remedying the fish therein, it is possible to turn off the second control valve 61 so as to prevent the medicine from being filtered out by the filtering material in the additional filtering containers 30 and from killing the germs in the water. In addition, the overflow outlet 236 of the water quality stabilizing chamber 23 will let excess water flow out of the drain pipe in case of power failure thereby preventing water overflowing everywhere.

The invention is naturally not limited in any sense to the particular features specified in the foregoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:
1. A raising control apparatus for living fish and water plants comprising:

a plurality of aquarium assemblies each including a frame having four partitions, a water quality stabilizing trough fitted in a lowest one of said partitions, three tanks each fitted in one of the remaining partitions, a pump having an inlet connected via a first pipe with said water quality stabilizing trough and an outlet connected via a second pipe with an uppermost one of said tanks which is in turn connected via a third pipe with an intermediate one of said tanks, a horizontally disposed dripping pipe connected between lower ends of said second and third pipes and having a plurality of perforations, a first downwardly depending pipe connected with an end of said dripping pipe, a second downwardly depending pipe connected with another end of said dripping pipe, a tank at an upper one of said partitions being connected with another tank at a lower one of said partitions by a tube, said water quality stabilizing trough being divided into a water collecting chamber under an outlet of said first downwardly depending pipe, a plurality of purifying chambers under an outlet of said second downwardly depending pipe, and a filtering chamber on which are piled up a plurality of additional filtering containers located under the perforations of said dripping pipe; and a water supply device having a reservoir connected with the water collecting chamber of said water quality stabilizing trough via a float ball valve.

2. The raising control apparatus for living fish and water plants as claimed in claim 1, wherein the water collecting chamber of said water quality stabilizing trough is formed with an overflow hole for connecting a drain pipe.

3. The raising control apparatus for living fish and water plants as claimed in claim 1, wherein said tanks are divided into a plurality of smaller chambers.

4. The raising control apparatus for living fish and water plants as claimed in claim 1, wherein said first and second downwardly depending pipes are provided with a control valve.

\* \* \* \* \*